(12) United States Patent
Sato

(10) Patent No.: US 9,946,107 B2
(45) Date of Patent: Apr. 17, 2018

(54) DISPLAY DEVICE

(71) Applicant: Japan Display Inc., Tokyo (JP)

(72) Inventor: Toshihiro Sato, Tokyo (JP)

(73) Assignee: Japan Display Inc., Tokyo (JP)

(*) Notice: Subject to any disclaimer, the term of this patent is extended or adjusted under 35 U.S.C. 154(b) by 320 days.

(21) Appl. No.: 14/838,578

(22) Filed: Aug. 28, 2015

(65) Prior Publication Data

US 2016/0077390 A1    Mar. 17, 2016

(30) Foreign Application Priority Data

Sep. 11, 2014  (JP) ................................. 2014-185474

(51) Int. Cl.
*G02F 1/1334* (2006.01)
*G02F 1/1343* (2006.01)

(52) U.S. Cl.
CPC ...... *G02F 1/1334* (2013.01); *G02F 1/134336* (2013.01); *G02F 2201/44* (2013.01); *G02F 2201/52* (2013.01)

(58) Field of Classification Search
CPC ................................................. G02F 2201/44
See application file for complete search history.

(56) References Cited

U.S. PATENT DOCUMENTS

| 2003/0052869 | A1* | 3/2003 | Fujii | ................. | G02F 1/133555 |
| | | | | | 345/204 |
| 2005/0057460 | A1* | 3/2005 | Lee | ..................... | H01L 27/3248 |
| | | | | | 345/76 |
| 2012/0099047 | A1* | 4/2012 | Lee | ..................... | H01L 27/3232 |
| | | | | | 349/62 |
| 2012/0268042 | A1 | 10/2012 | Shiobara | | |
| 2015/0009436 | A1* | 1/2015 | Kim | ..................... | G02F 1/1334 |
| | | | | | 349/33 |
| 2015/0108435 | A1* | 4/2015 | Huh | ..................... | H01L 51/5256 |
| | | | | | 257/40 |

FOREIGN PATENT DOCUMENTS

JP    2012-226931 A    11/2012

* cited by examiner

*Primary Examiner* — Dennis Y Kim
(74) *Attorney, Agent, or Firm* — TYPHA IP LLC

(57) ABSTRACT

A display device including a plurality of pixels includes a first display part including a first electrode, a second electrode and a light emitting layer provided between the first electrode and the second electrode, and a second display part including the second electrode, a third electrode and a light function layer provided between the second electrode and the third electrode, the light function layer controlling the diffusion state or transparency state of light and being provided on the same side the light emitting layer with respect to the second electrode.

16 Claims, 14 Drawing Sheets

DISPLAY DEVICE

CROSS REFERENCE TO RELATED APPLICATIONS

This application is based upon and claims the benefit of priority from the prior Japanese Patent Application No. 2014-185474 filed on Sep. 11, 2014, the entire contents of which are incorporate herein by reference.

FIELD

The present invention is related to a display device and one disclosed embodiment is related to the shape of a pixel layout in the display device.

BACKGROUND

In recent years, the demand for high definition and low power consumption in a light emitting display device for use in mobile devices has increased. Display devices which use liquid crystal display devices (LCD) or self-light emitting elements such as organic EL elements (organic light-emitting diode: OLED) or quantum dots in a display part or electronic paper and the like are being adopted as display devices for use in mobile devices.

A display device using a self-light emitting element such as that described above does not require a backlight light source or polarization plate that are require in liquid crystal display devices and since the drive voltage of a light emitting element which is a light source is low, such devices are attracting attention as low power consumption and thin light emitting display devices. In addition, because it is possible to form a display device with only a thin film, it is possible to realize a flexible display device. Furthermore, since a glass substrate is not used, such devices are attracting attention for being light and difficult to break.

In particular, in an organic EL display device, light is output by flowing a current to a light emitting element. Although the light which is output from a light emitting element proceeds to the side of an observer via other layers, a part of the light is reflected at a boundary where different layers contact, the light is wave-guided through the layers, does not reach an observer and cannot be used effectively. In addition, the wave-guided light is transmitted to a pixel adjacent to a pixel which attempts to emit light and is output to the exterior from the adjacent pixel which is the cause of what is called leaking light. In particular, in high definition display devices which exceed 300 ppi, around 80 percent of the light which is produced by a light emitting element is lost by being wave-guided through each layer as described above.

Thus, light extraction technology is being developed in order to efficiently extract light output from a light emitting element to the exterior. For example, in Japanese Laid Open Patent Application No. 2012-226931, an extraction structure is proposed in which a high refractive index transparent layer having a higher refractive index than an organic compound which forms a light emitting element is provided on the light extraction side of the light emitting element and a fine concave/convex structure is provided on the light extraction side of the high refractive index transparent layer. According to the Japanese Laid Open Patent Application No. 2012-226931, since a part of the light which is trapped within the light emitting element can not be used effectively and is transmitted to a high refractive index layer and is extracted to the exterior by the light extraction structure, it is possible to realize a brighter display device.

However, in the display device disclosed in Japanese Laid Open Patent 2012-226931, it is necessary to provide the structure described above a light emitting element which leads to a longer processing, accompanying increase in costs and a drop in yield. In addition, in the display device shown in the Japanese Laid Open Patent Application No. 2012-226931, because the light wave-guided in a planar direction of a substrate from a light emitting element is absorbed by a visible light absorbing material, the display device does not contribute to an improvement in a light extraction ratio.

SUMMARY

A display device including a plurality of pixels according to one embodiment of the present invention includes a first display part including a first electrode, a second electrode and a light emitting layer provided between the first electrode and the second electrode, and a second display part including the second electrode, a third electrode and a light function layer provided between the second electrode and the third electrode, the light function layer controlling the diffusion state or transparency state of light and being provided on the same side the light emitting layer with respect to the second electrode.

In addition, a display device including a plurality of pixels according to one embodiment of the present invention includes a first display part including a first electrode, a second electrode, a third electrode, a light emitting layer provided between the first electrode and the second electrode, and a light function layer provided between the second electrode and the third electrode, the light function layer controlling a diffusion state or transparency state of light, each of the first electrodes of the plurality of pixels are mutually provided separately and the second electrode and the third electrode are provided in common with the plurality of electrodes, and a second display part including the second electrode, the third electrode and the light function layer provided between the second electrode and the third electrode, the light emitting layer and at least one part of the light function layer are aligned so as to pass a plane parallel to a surface of a substrate provided with the first display part and the second display part.

DESCRIPTION OF EMBODIMENTS

Figure 1:
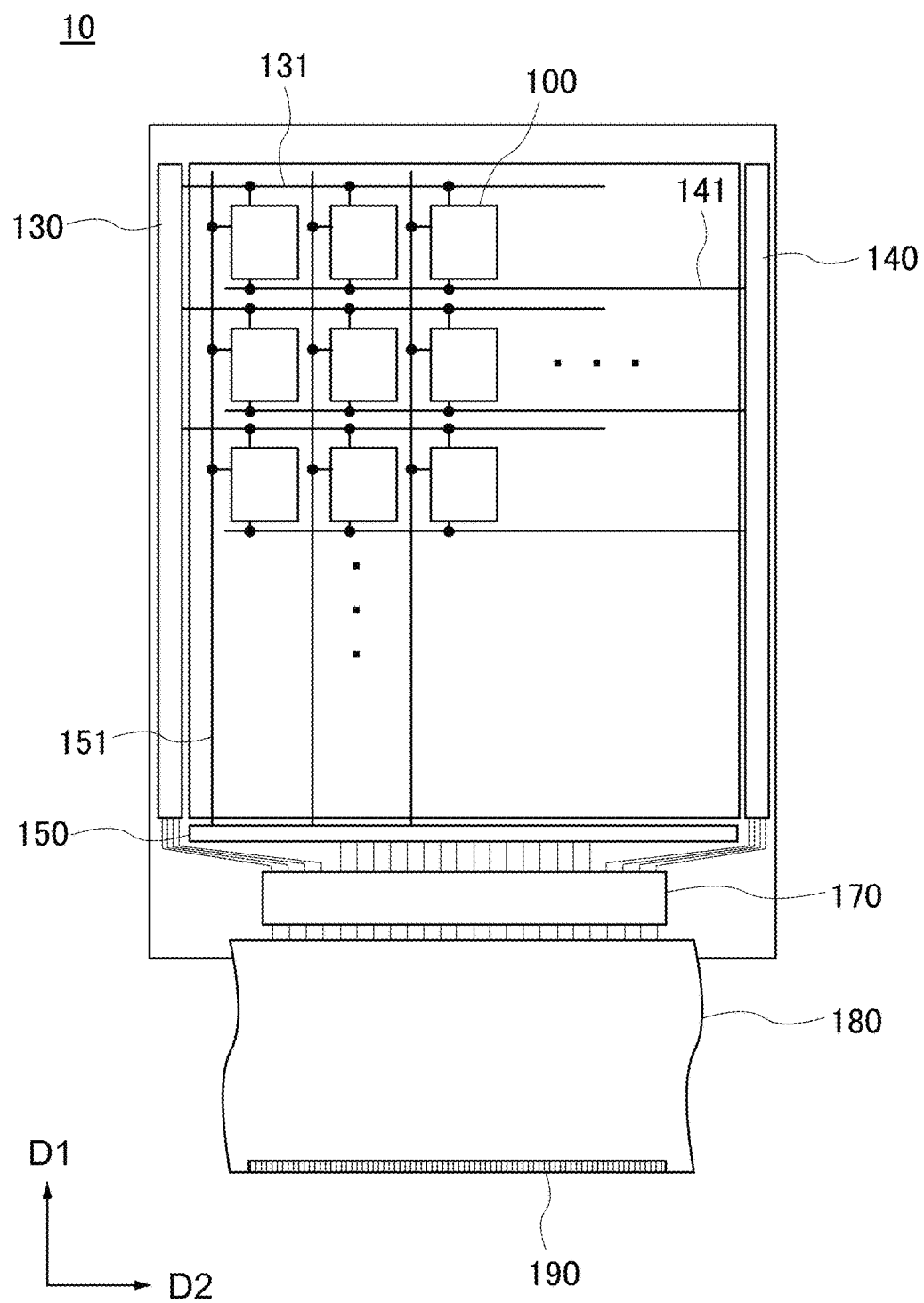
FIG. 1 is a planar view diagram showing a summary of a display device related to embodiment one of the present invention.

Each embodiment of the present invention is explained below while referring to the drawings. Furthermore, the disclosure is merely an example and those components and the like that a person ordinarily skilled in the art could easily conceive of by making appropriate modifications while maintaining the concept of the invention are included with the scope of the present invention. In addition, although the width, thickness and shape of components in the diagrams are sometimes represented schematically compared to actual components in order to clarify explanation, these are merely example and should not limit an interpretation of the present invention. In addition, in the specification and each drawing, the same reference symbols are attached to the same components that have previously been mentioned in the drawings and a detailed explanation is sometimes omitted where appropriate. The embodiments below aim to provide a display device which can improve light extraction efficiency.

<Embodiment One>

An outline of a display device 10, pixel layout and cross-sectional structure related to embodiment one of the present invention is explained using FIG. 1 to FIG. 5. The display device 10 in embodiment one is explained using a top emission type organic EL display device including an organic EL element and light function layer. The organic EL element realizes full color by outputting light in each color filter red (R), green (G) and blue (B) in an upper surface direction of a substrate. The light function layer disperses light output in a planar direction of a substrate from an organic EL element in an upper surface direction of a substrate. In embodiment one, although a display device using an organic EL element is exemplified as a light emitting element, the present invention is not limited to the organic EL element. For example, a display device using a quantum dot (QD) or inorganic EL element may also be used as a light emitting element. In addition, in embodiment one, although a display device using a polymer dispersed liquid crystal (PDLC) is exemplified as a light function layer, a display device using an element which can control a light diffusion state and transparency state using an alternative method can also be used. In addition, although a top emission type display device is exemplified in embodiment one, a bottom emission type display device may also be used.

<Outline of Display Device 10>

FIG. 1 is a planar view diagram showing an outline of a display device related to embodiment one of the present invention. In FIG. 1, only a transistor array substrate provided with a transistor and wiring is shown. The transistor array substrate is provided with pixels 100 provided in M rows and N columns (M and N are natural numbers) in a matrix shape, and each pixel 100 is controlled by a gate driver circuit 130, emission driver circuit 140 and data driver circuit 150.

Here, the gate driver circuit 130 is a driver circuit which selects a row for executing data writing and is provided corresponding to each pixel 100. A gate wire 131 extending in a second direction D2 is connected to the gate driver circuit 130. In addition, the emission driver circuit 140 is a driver circuit which controls light emitted from a light emitting element provided in a pixel and is provided corresponding to each pixel 100. An emission control wire 141 extending in the second direction D2 is connected to the emission driver circuit 140. The data driver circuit 150 is a circuit for supplying gradation data to each pixel 100 and is provided corresponding to each pixel 100. A data wire 151 extending in a first direction D1 is connected to the data driver circuit 150. In this display device, gradation data is supplied in sequence to a pixel selected by the gate driver circuit 130 and emission driver circuit 140.

The gate driver circuit 130, emission driver circuit 140 and data driver circuit 150 are each connected to a driver IC 170 via wiring respectively. The driver IC 170 is connected with an FPC 180. An external terminal 190 for connecting with external device is provided in the FPC 180. Although a structure is exemplified in FIG. 1 in which the gate driver circuit 130, emission driver circuit 140 and data driver circuit 150 are all connected to a driver IC 170, the present invention is not limited to this structure and a part or all of these circuits may also be connected to the FPC 180 without using the driver IC 170.

<Pixel Layout of Display Device 10>

Figure 2:
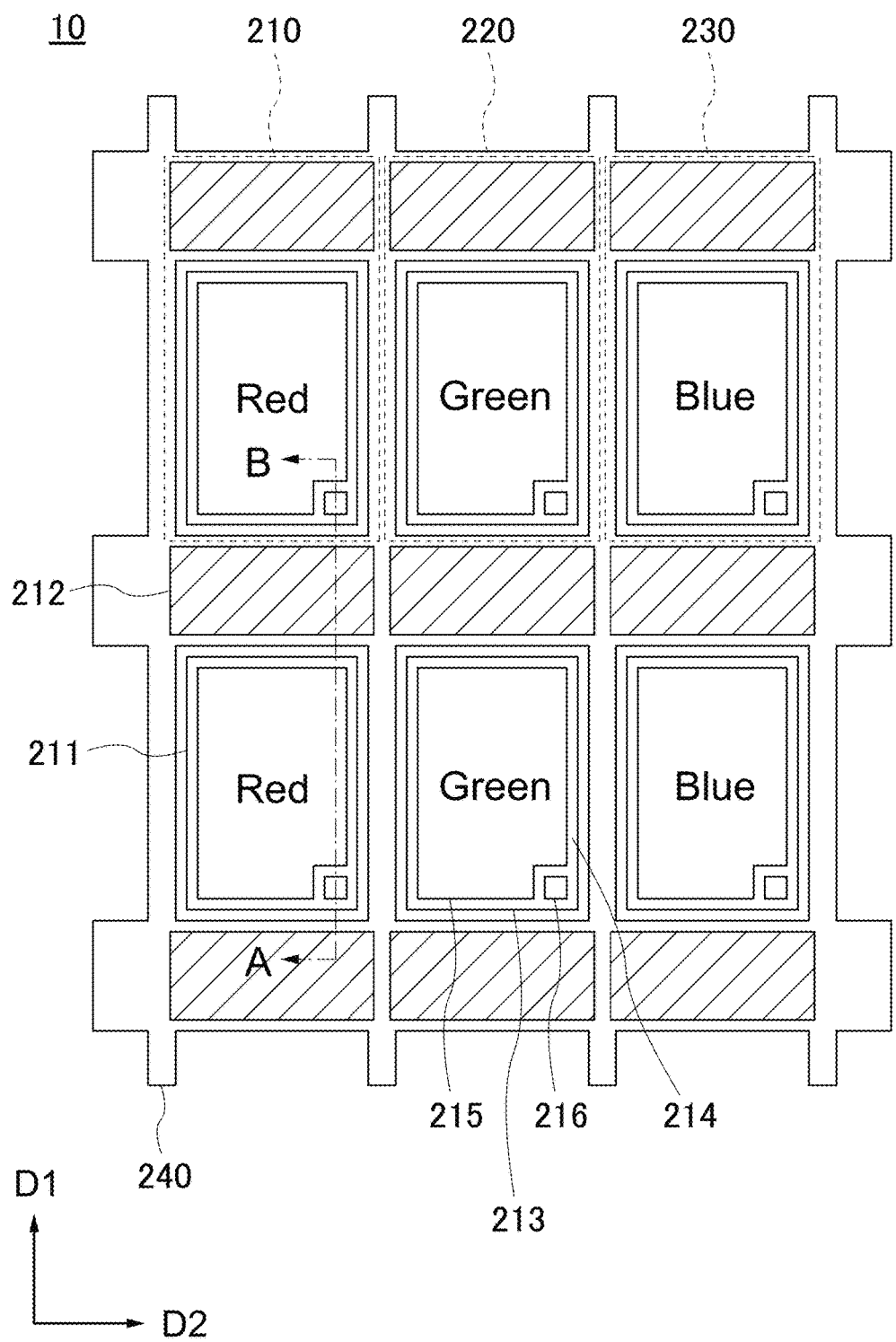
FIG. 2 is a planar view diagram showing a pixel layout in a display device related to embodiment one of the present invention.

FIG. 2 is a planar view diagram showing a pixel layout of a display device related to embodiment one of the present invention. In FIG. 2, a pixel layout is explained in which three rows and three columns of pixels are representatively shown among the pixel layout of the display device 10. As is shown in FIG. 2, the display device 10 includes a red (R) pixel 210, green (G) pixel 220 and blue (B) pixel 230. Each of the pixels described above includes a first display part 211 and second display part 212. Here, the first display part is provided in an area (area in which a PDLC electrode 240 is not provided) opened with a PDLC electrode 240 and the second display part 212 is provided above the PDLC electrode 240. In addition, although not shown in FIG. 2, a common electrode is provided across a plurality of pixels.

The first display part 211 includes a pixel electrode 213 which supplies a current or voltage corresponding to light emitting intensity to a light emitting element, a side wall 214 which covers an end part of the pixel electrode 213 and sections each pixel, a light emitting area 215 which is exposed from the side wall 214 and outputs light in each color R, G, B, and a via 216 for physically and electrically connecting the pixel electrode 213 with other wires. Here, the common electrode provided across a plurality of pixels described above may be provided in at least the light emitting area 215 of the first display part 211 and the second display part 212.

A light function layer is provided in the second display part 212. A structure in which a PDLC is provided in the second display part 212 as a light function layer is exemplified in embodiment one. As described above, the light function layer is not limited to a PDLC and an element which can control the diffusion state and transparency state of light using an alternative method can also be used. In addition, an element which can control the reflecting state and transparency state of light may also be used. As is shown in the display device 10, the second display part 212 is provided between the first display parts 211 of the same color. However, the present invention is not limited to this structure and the second display part 212 may also be provided between first display parts 211 of different colors.

<Cross-Sectional Structure of a Pixel>

Figure 3:
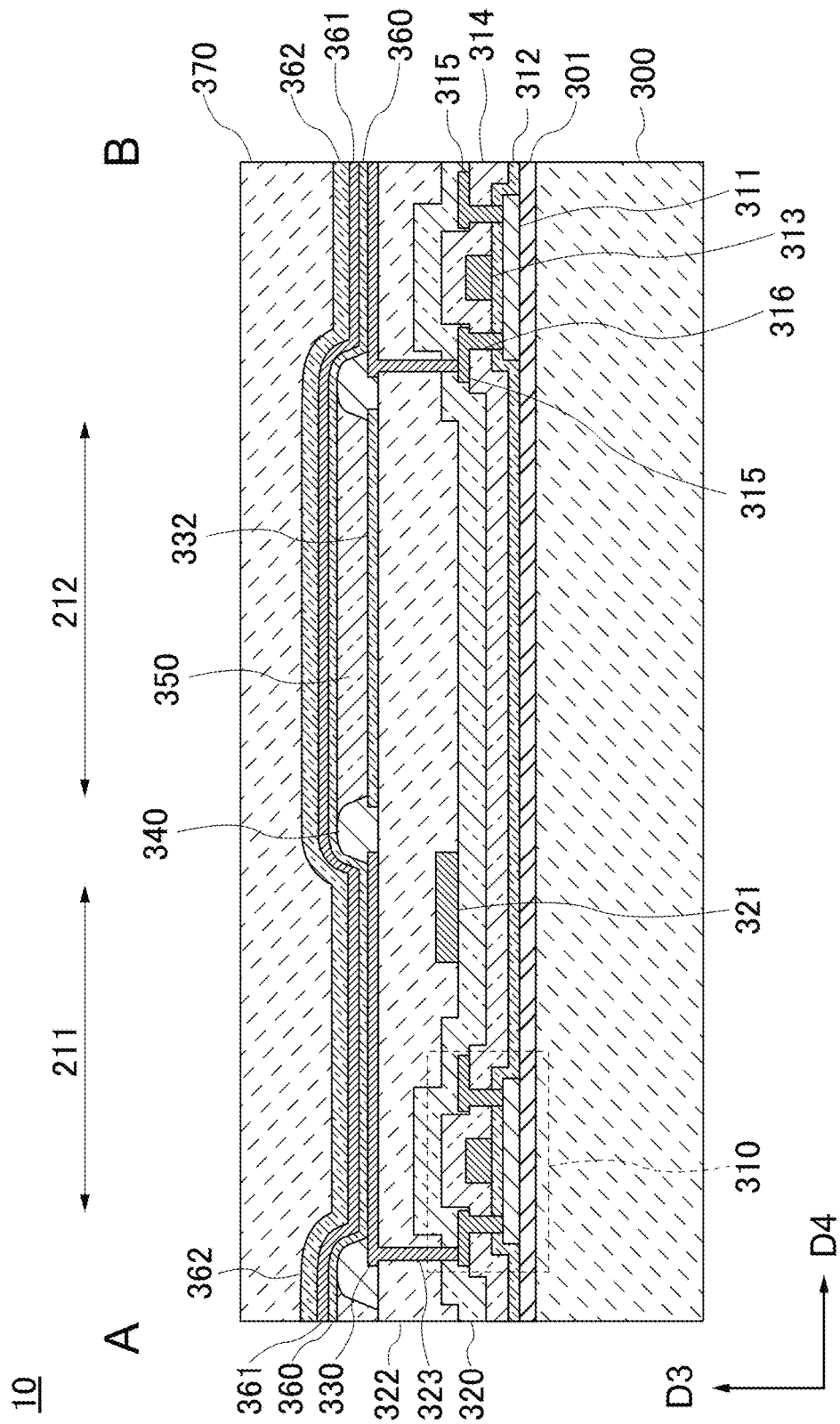
FIG. 3 is a cross-sectional diagram of the line A-B in a pixel of the display device shown in FIG. 2.

FIG. 3 is a cross-sectional diagram of the line A-B of a pixel in the display device shown in FIG. 2. A cross-sectional structure of one pixel among the plurality of pixels provided in the display device 10 is explained in detail In FIG. 3. As is shown in FIG. 3, the display device 10 includes a transistor element and a light emitting element. The transistor element includes a transistor 310 and the light emitting element includes a light emitting layer 360. The light emitting element of the display device 10 includes the first display part 211 and second display part 212. The first display part 211 includes a pixel electrode 330, a common electrode 361 and a light emitting layer 360 provided between the pixel electrode 330 and common electrode 361. The second display part 212 includes a common electrode 361, a PDLC electrode 332, and a PLDC layer 350 provided between the common electrode 361 and PDLC electrode 332 and which can control the diffusion state and transparency state of light. Here, the pixel electrode 330, light emitting layer 360, PDLC electrode 332 and PDLC layer 350 are provided below the lower surface side (opposite direction to the arrow in a direction D3) of the common electrode 361.

Next, a cross-sectional structure of a transistor element and light emitting element of the display device 10 is explained in detail. The transistor element includes a substrate 300 and a top gate type transistor 310 provided via a ground layer 301 above the substrate 300. Here, the transistor 310 includes a semiconductor layer 311, gate insulation layer 312, gate electrode 313, first interlayer insulation layer 314 and source/drain electrode 315. A contact 316 is provided in the gate insulation layer 312 and first interlayer insulation layer 314, and by provided the source/drain electrode 315 within the contact 316 and contacting with the semiconductor layer 311, the semiconductor layer 311 and source/drain electrode 315 are electrically connected.

It is possible to use silicon nitride ($SiN_x$), silicon nitride oxide ($SiN_xO_y$), silicon oxide ($SiO_x$), silicon oxide nitride ($SiO_xN_y$), aluminum nitride ($AlN_x$), aluminum nitride oxide ($AlN_xO_y$), aluminum oxide ($AlO_x$) and aluminum oxide nitride ($AlO_xN_y$) as the ground layer 301 (x and y are arbitrary). In addition, a structure in which these films are stacked may also be used.

Here, the $SiO_xN_y$ film and $AlO_xN_y$ film are silicon compounds and aluminum compounds containing less nitrogen (N) then oxygen (O). In addition, the $SiN_xO_y$ film and $AlN_xO_y$ film are silicon compounds and aluminum compounds containing less oxygen than nitrogen.

It is possible to use a transistor using for example amorphous silicon, polysilicon, single crystal silicon, an amorphous oxide semiconductor, an oxide semiconductor including a crystal structure and an organic semiconductor as the semiconductor layer 311. In addition, although a top gate type transistor is exemplified in FIG. 3, the present invention is not limited to this structure and a bottom gate type transistor may also be used.

The gate insulation layer 313 can be appropriately selected according to the material used in the semiconductor layer 311. For example, in the case where a silicon group material such as amorphous silicon, polysilicon or single crystal silicon is used in the semiconductor layer 311, it is possible to use an insulator including a silicon compound such as $SiO_x$, $SiN_x$, $SiO_xN_y$, $SiN_xO_y$ and silicon. In addition, it is possible to use a structure in which these layers are stacked. In the case where an oxide metal material such as an amorphous oxide semiconductor or oxide semiconductor including a crystal structure is used for the semiconductor layer 311, it is possible to use an oxide insulator including metal which is included in the oxide semiconductor as well as the insulators described above as the gate insulation layer 312. In addition, it is possible to use a structure in which a plurality of oxide insulators is stacked. In the case where an organic semiconductor is used for the semiconductor layer 311, it is possible to use an organic insulator as the gate insulation layer 312. In addition, it is possible to use a structure in which a plurality of organic insulators is stacked.

It is possible to use a general metal material or conductive polysilicon for the gate electrode 313. For example, it is possible to use aluminum (Al), titanium (Ti), chrome (Cr), cobalt (Co), nickel (Ni), zinc (Zn), molybdenum (Mo), indium (In), tin (Sn), hafnium (Hf), tantalum (Ta), tungsten (W), platinum (Pt) and bismuth (Bi) and the like. In addition, an alloy of these materials may also be used. In addition, a nitride of these materials may also be used. Furthermore, a structure in which films of these materials are stacked may also be used. A material including work function in which a transistor is switched off when a gate voltage is 0V, which is called an enhancement type transistor, can be used for the gate electrode 313.

It is possible to use a general metal material as the source/drain electrode 315. For example, it is possible to use copper (Cu), silver (Ag) or gold (Au) as the source/drain electrode 315 other than the material exemplified above for the gate electrode 313. In addition, an alloy of these materials may also be used. Furthermore, a structure in which these films are stacked may also be used. A metal material with a smaller work function than the semiconductor layer 311 may be used for the source/drain electrode 315 in order to obtain a good electrical contact with the semiconductor layer 311.

In addition, the display device 10 includes a second interlayer layer 320, an upper layer wiring layer 321, a third interlayer layer 322 and pixel electrode 330 above the transistor 310. The upper layer wiring layer 321 is provided above the second interlayer layer 320. The third interlayer layer 322 is provided above the second interlayer layer 320 and the upper layer wiring layer 321 and relieves a step formed by the transistor 310 and the upper layer wiring layer 321. The pixel electrode 330 is provided above the third interlayer layer 322. Here, a via 323 is provided in the second interlayer layer 320 and third interlayer layer 322. The pixel electrode 330 is provided within the via 323 and by contacting with source/drain electrode 315, the source/drain electrode 315 and pixel electrode 330 are electrically connected.

A general inorganic insulation layer or organic insulation layer can be used for the second interlayer layer 320. For example, in the case where an inorganic material is used as the insulation layer, it is possible to use $SiO_x$, $SiN_x$, $SiO_xN_y$, $SiN_xO_y$, $AlO_x$, $AlN_x$, $AlO_xN_y$, $AlN_xO_y$, or a TEOS film and the like (x and y are arbitrary). In addition, a structure in which these materials are stacked may also be used. Furthermore, in the case where an organic material is used as the insulation material, it is possible to use a polyimide resin, acrylic resin, epoxy resin, silicone resin, fluorine resin and siloxane resin and the like. In addition, a structure in which these materials are stacked may also be used. Furthermore, a structure in which an inorganic insulation layer and organic insulation layer described above are stacked may also be used.

Here, the TEOS film indicates a CVD film using TEOS (Tetra Ethyl Ortho Silicate) as the raw material and is a film which has the effect of relieving and flattening a ground step.

Since flatness properties are required for an upper layer, the third interlayer layer 322 is preferred to include at least an organic insulation layer. In addition, the third interlayer layer 322 may also include a TEOS film instead of an organic insulation layer. The third interlayer insulation layer 322 may be an organic insulation single layer or a TEOS film single layer and a stacked structure including the layers exemplified above may be used as the second interlayer layer 320.

If the display device is a top emission type display device, it is possible to use a reflective material as the pixel electrode 330 and if the display device is a bottom emission type display device, it is possible to use a transparent material as the pixel electrode 330. It is possible to select a material with a high reflectance as the reflective material, for example Al, Ti, Mo, Ni, Ag or an alloy of these. In addition, it is possible to use a structure in which films using these materials are stacked. In particular, in the case where a reflective material is used for a pixel electrode, transparent materials descried herein may be stacked above a reflective surface with the aim of optimizing the work function of the uppermost surface. In addition, it is possible to use a conductive material with a high visible light transparency as the transparent material, for example ITO (indium tin oxide), ZnO (zinc oxide), SnO2 (tin oxide), In2O3 (indium oxide), IZO (zinc oxide with indium added as a dopant), GZO (zinc oxide with gallium added as a dopant), AZO (zinc oxide with aluminum added as a dopant), or titanium oxide with an impurity such as niobium (Nb) added as a dopant.

In addition, the PDLC electrode 322 is provided on a plane parallel to the substrate surface with the pixel electrode 330, that is, above the third interlayer layer 322. A side wall 340, PDLC layer 350, light emitting layer 360, common electrode 361 of a light emitting element, protective layer 362 and cover layer 370 are included above the pixel electrode 330 and PDLC electrode 332. The side wall 340 covers an end part of the pixel electrode 330 and an end part of the PDLC electrode 332, and includes an aperture part corresponding to the first display part 211 and second display part 212. The PDLC layer 350 is provided in an area enclosed by the side wall 340 above the PDLC electrode 332 in the second display part 212. The light emitting layer 360 is provided in common with a plurality of plurality of pixels above the pixel electrode 330 of the first display part 211, above the PDLC layer 350 of the second display part 212 and above the side wall 340. The common electrode 361 is provided in common with a plurality of pixels above the light emitting layer 360. The protective layer 362 is provided so as to cover the light emitting layer 360 and the common electrode 361 and includes at least moisture preventing properties. The cover layer 370 is provided above the protective layer 362 and relieves a step formed by structure which forms the light emitting element.

Here, in FIG. 3, although a structure in which the light emitting layer 360 is also provided in the display part 212 is exemplified, the present invention in not limited to this structure, for example, a structure is possible in which the common electrode 361 and PDLC layer 350 are in contact without providing the light emitting layer 360 in the second display part 212.

Although a structure using the PDLC layer 350 as a light function layer which can control the diffusion state and transparency state of light is exemplified in FIG. 3, the present invention is not limited to this structure. For example, it is possible to use other light function layers which can control the diffusion state and transparency state of light. In addition, it is also possible to use a light function layer which can control the reflecting state and transparency state of light. A layer which performs reflecting control using MEMS (Micro Electro Mechanical Systems) or performs tone control by electrical control using an electro-chromic material can be given as an example of the light function layer and the same structure described above can be applied in either case.

Here, the pixel electrode 330 provided in a plurality of pixels are each provided separately. Similarly, the PDLC electrode 332 provided in a plurality of pixels are each provided separately. On the other hand, the common electrode 361 is provided in common with a plurality of pixels. Since the display device 10 exemplifies a top emission type display device, the pixel electrode 330 includes reflective properties and the common electrode 361 includes transparency. In addition, the PDLC electrode 332 includes transparency. Furthermore, since the pixel electrode 330 and PDLC electrode 332 are aligned above a plane parallel to a substrate surface and the light emitting layer 360 is provided above the light emitting layer 360 is provided above the pixel electrode 330 and the PDLC layer 350 is provided above the PDLC electrode 332, the light emitting layer 360 and PDLC layer 350 also exit in a plane parallel to the surface of a substrate.

A transparent material can be used for the PDLC electrode 332. By using a transparent material for the PDLC electrode 332 and setting the PDLC layer 350 to a transparent state, it is possible to realize a transparent type display device in which the background appears transparent. It is possible to use ITO, ZnO, SnO2, In2O3, IZO, GZO, AZO or titanium oxide added with impurities such as niobium (Nb) as a dopant as the transparent material used for the PDLC electrode 332. However, it is also possible to a light absorbing material or reflecting material in addition to a transparent material for the PDLC electrode 332 according to purpose. For example, a transparent electrode formed with a thickness sufficiently thin to allow light to pass through is also possible even when using a metal material or semi-transparent material. This is the same for the electrode used in the first display part.

It is possible to use a general resin material for the side wall 340 and it is also possible to use a photosensitive resin material. For example, it is possible to use a photosensitive acrylic or photosensitive polyimide and the like as the photosensitive resin.

Figure 14:
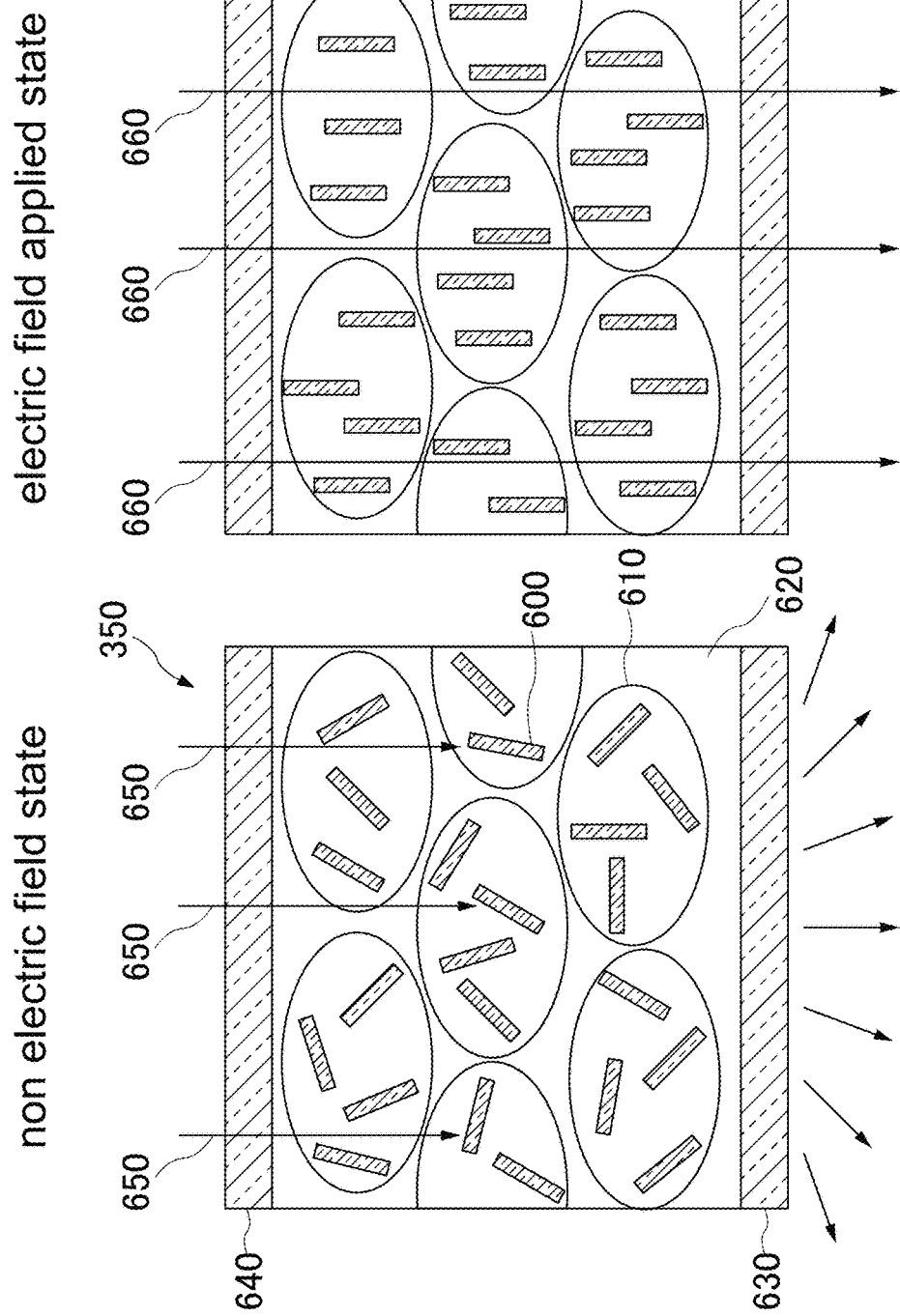
FIG. 14 is a cross-sectional diagram showing the operation of a light function layer of a display device related to the present invention.

Since the PDLC layer 350 forms a unique polymer network structure within a liquid crystal layer, the arrangement of liquid crystal molecules induce an irregular state and light is dispersed by the operation of the polymer network. Although the PDLC layer 350 is explained in detail in FIG. 14, by controlling the voltage applied to the PDLC electrode 332 and common electrode 361, it is possible to control the diffusion state and transparency state of the PDLC layer 350. It is possible to use the PDLC which is in a diffusion state when no electrode field is applied and in a transparent state by applying an electric field as the PDLC layer 350. In addition, unlike a PDLC, it is possible to use a reverse PDLC which is in a transparent state and is obtained when an electric field is not applied and in a diffusion state by applying an electric field as the PDLC layer 350. In the case where the PDLC layer 350 is in a diffusion state, light which is output from an adjacent light emitting layer 360 of the first display part 211 is dispersed and dispersed light is output in a vertical direction (D3 direction) of the substrate 300. In addition, as described above, a component other than a PDLC layer may also be used as the light function layer.

It is possible to use a general light emitting material which emits light by current excitation or voltage excitation as the light emitting layer 360. The light emitting material may be an organic EL material or an inorganic material. In addition, a quantum dot may also be used as a light emitting material. In the case where the light emitting material is an organic EL material, the light emitting layer 360 may be formed from an organic EL layer which outputs lights at wavelengths of each color R, G, B and may also be formed from an organic EL layer which outputs light in different wavelengths to those described above. In addition, the light emitting layer 360 may also include for example and electron injection material, an electron transport material, a hole injection material and a hole transport material in addition to the light emitting material.

It is possible to use a transparent material as the common electrode 361 if the display device is top emission type display device and it is possible to use a reflective material if the display device is a bottom emission type display device. It is possible to use for example ITO, ZnO, $SnO_2$, $In_2O_3$, IZO, GZO, AZO and titanium oxide with impurities such as Nb added as a dopant as the transparent material the same as the pixel electrode 330. In addition, it is possible to use Al, Ti, Mo, Ni, Ag or an alloy of these as the reflective material the same as the pixel electrode 330. In addition, a structure is possible in which films using the material described above are stacked.

The protective layer 362 is provided so as to cover at least the light emitting layer 360 and it is possible to use a material with high blocking capabilities to water or impurities. For example, it is possible to use a $SiN_x$ film, $SiO_x$ film, $SiN_xO_y$ film, $SiO_xN_y$ film, $AlN_x$ film, $AlO_x$ film, $AlO_xN_y$ film and $AlN_xO_y$ film and the like (x and y are arbitrary). In addition, a structure is possible in which these films are stacked.

<Operation of Light Function Layer>

Figure 4:
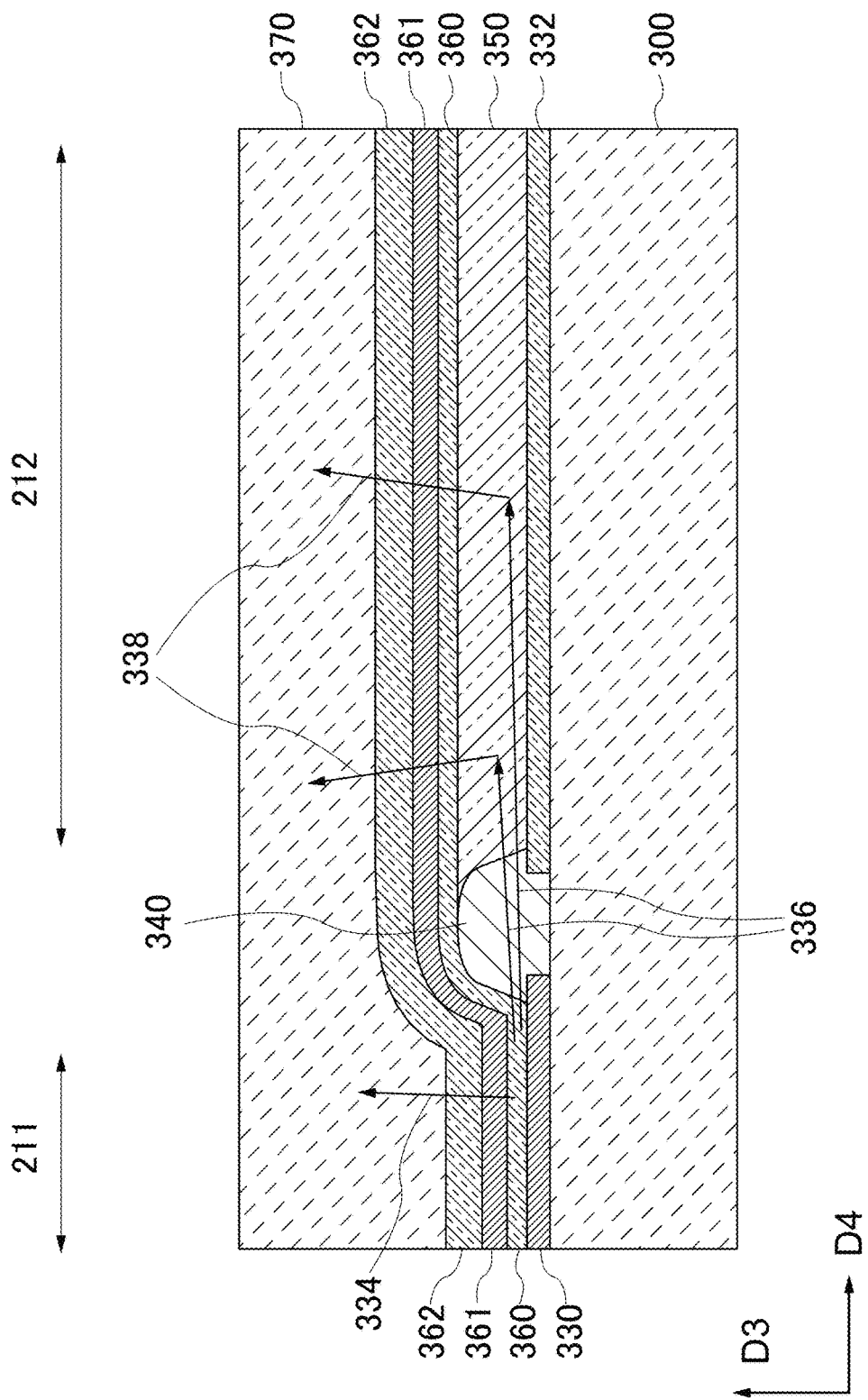
FIG. 4 is a cross-sectional diagram showing a path of light output from a light emitting layer in a display device related to embodiment one of the present invention.

FIG. 4 is a cross-sectional diagram showing a path of light output from a light emitting layer in the display device related to embodiment one of the present invention. As is shown in FIG. 4, light 334 output towards an upwards direction (direction D3) from the light emitting layer 360 in the first display part 211 passes through the common electrode 361, protective layer 362 and cover layer 370 and is output in the direction D3. In addition, Light 336 output towards a planar direction (direction D4) of a substrate from the light emitting layer 360 of the first display part 211 passes through the side wall 340, reaches the PDLC layer 350 and is dispersed by the PDLC layer 350. A path of a part of the light 338 which is dispersed by the PDLC layer 350 is changed to the direction D3, passes through the light emitting layer 360, common electrode 361, protective layer 362 and cover layer 370 and is output in the direction D3. In other words, it is possible to extract light to the exterior that was difficult to extract in a conventional display device outputting in the direction D4 from the light emitting layer 360 of the first display part 211.

Figure 5:
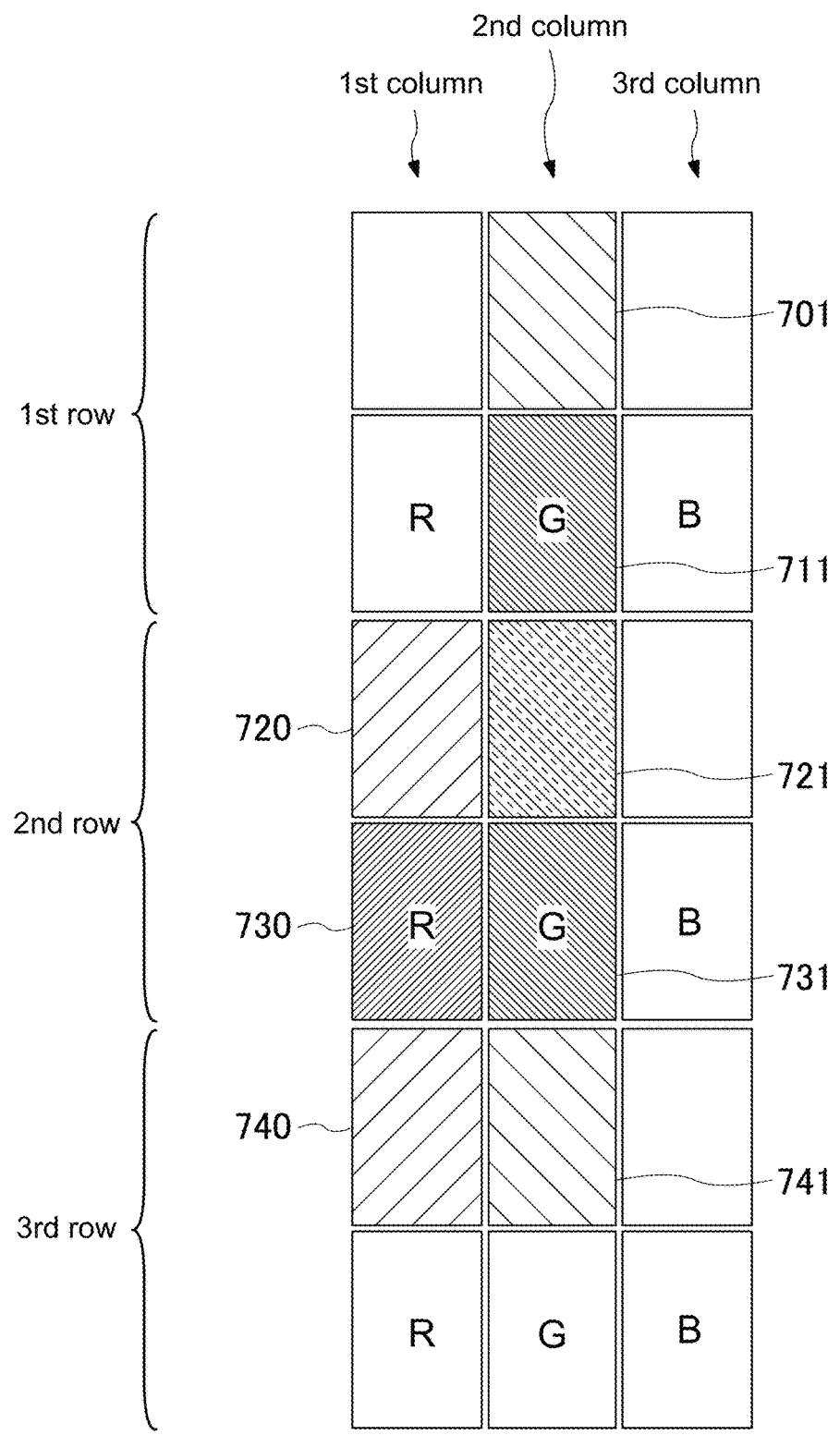
FIG. 5 is a planar view diagram showing the appearance of light extracted from a PDLC layer when part of a pixel is made to emit light in the display device related to embodiment one of the present invention.

FIG. 5 is a planar view diagram showing the appearance of light extracted from a light function layer when a part of a pixel is made to emit light in the display device related to embodiment one of the present invention. The planar view shown in FIG. 5 is a planar view diagram when the second row first column first display part 730 (R pixel), first row second column first display part 711 (G pixel) and second row second column first display part 731 (G pixel) are made to emit light.

As is shown in FIG. 5, by making the second row first column first display part 730 emit red light, the red light which is output from first display part 730 and dispersed output from the second row first column second display part 720 and the third row first column second display part 740 adjacent to the first display part 730. In addition, by making the first row second column first display part 711 and second row second column first display part 731 emit green light, the green light which is output from first display part 711, 731 and dispersed output from the first row second column second display part 701, the second row second column second display part 721 and the third row second column second display part 741 adjacent to each pixel. Here, since the second display part 721 positioned between two first display parts 711, 731 which emit green light disperse light from both the first display parts 711, 731, the intensity of the light which is output is stronger compared to the second display parts 701, 741.

As described above, according to the display device related to embodiment one of the present invention, by making the first display part 211 including the light emitting layer 360 and the second display part 212 including the PDLC layer 350 as a light function layer adjacent to each other, it is possible to disperse light output from the first display part 211 in a planar direction of a substrate using the second display part 212 and output the light in a perpendicular direction to the substrate surface. Therefore, it is possible to extract more of the light output from a light emitting layer to the exterior and improve light extraction efficiency.

In addition, by using the PDLC layer 350 which can control the diffusion state and transparent state of light as a light function layer, it is possible to improve light extraction efficiency as described above if the PDLC layer 350 is in a diffusion state, and use the display device 10 as a transparent type display device if the PDLC layer 350 is in a transparent state.

In addition, since it is possible to separately control the diffusion state and transparency state of the PDLC layer 350 for each pixel by providing the PDLC electrode 332 separately with respect to each of a plurality of pixels, it is possible to improve light extraction efficiency while continuing to use the display device 10 as a transparent type display device In addition, by providing a top emission type display device where the pixel electrode 220 includes reflective properties and the common electrode 361 and PDLC electrode 332 include transparency, it is possible to obtain a higher aperture ratio and a display device with a better light extraction efficiency.

In addition, since the light emitting layer 360 and at least a part of the PDLC 350 are aligned so as to pass a plane parallel to a surface of a substrate, it is possible to disperse light output in a planar direction of a substrate from the light emitting layer 360 using the PDLC layer 350.

In addition, it is possible to better clarify the boundary between the first display part 211 and the second display part 212 using the side wall 340.

<Modified Example of Embodiment One>

Figure 6:
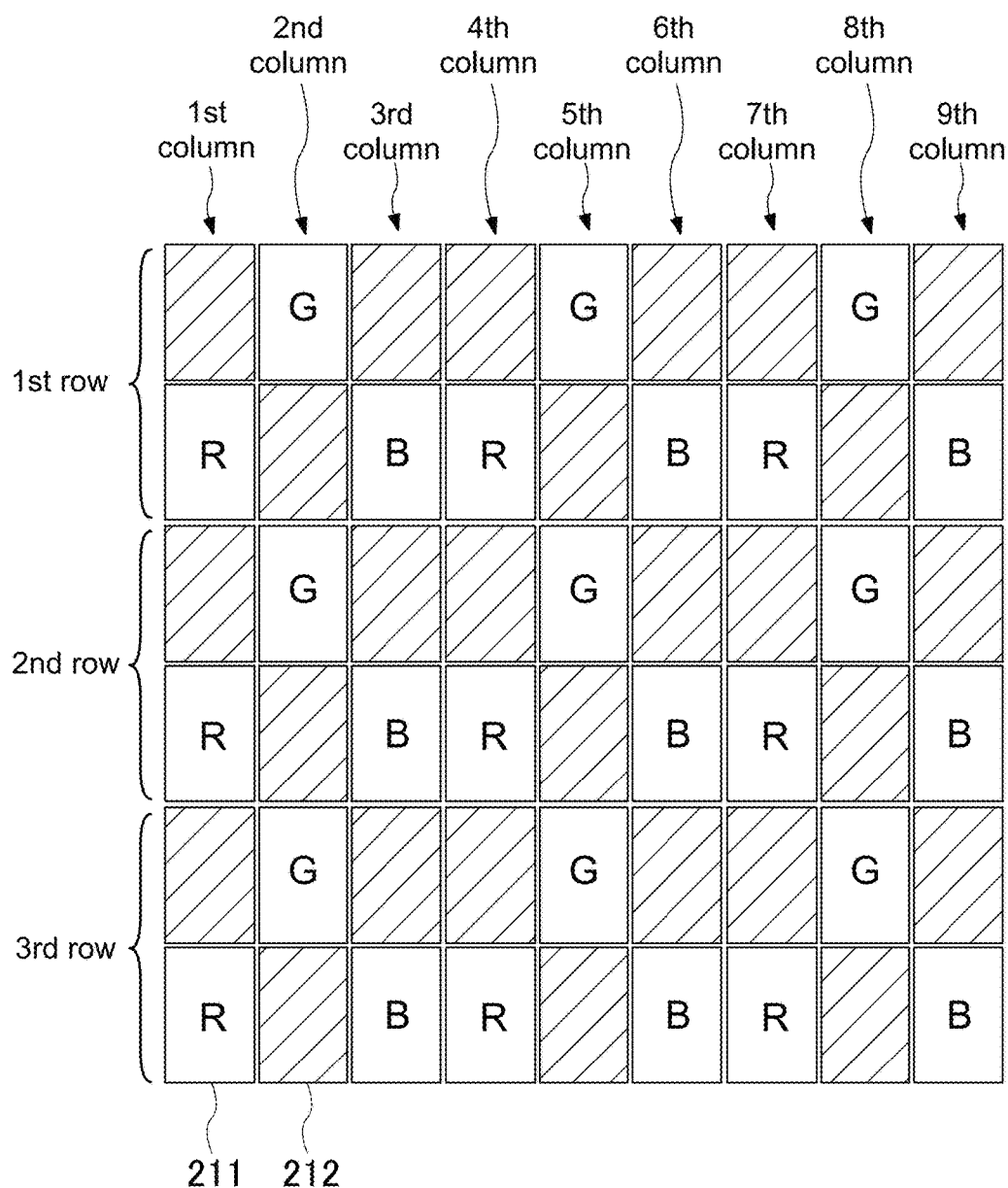
FIG. 6 is a planar view diagram showing a pixel layout of a display device related to a modified example one of embodiment one of the present invention.
Figure 7:
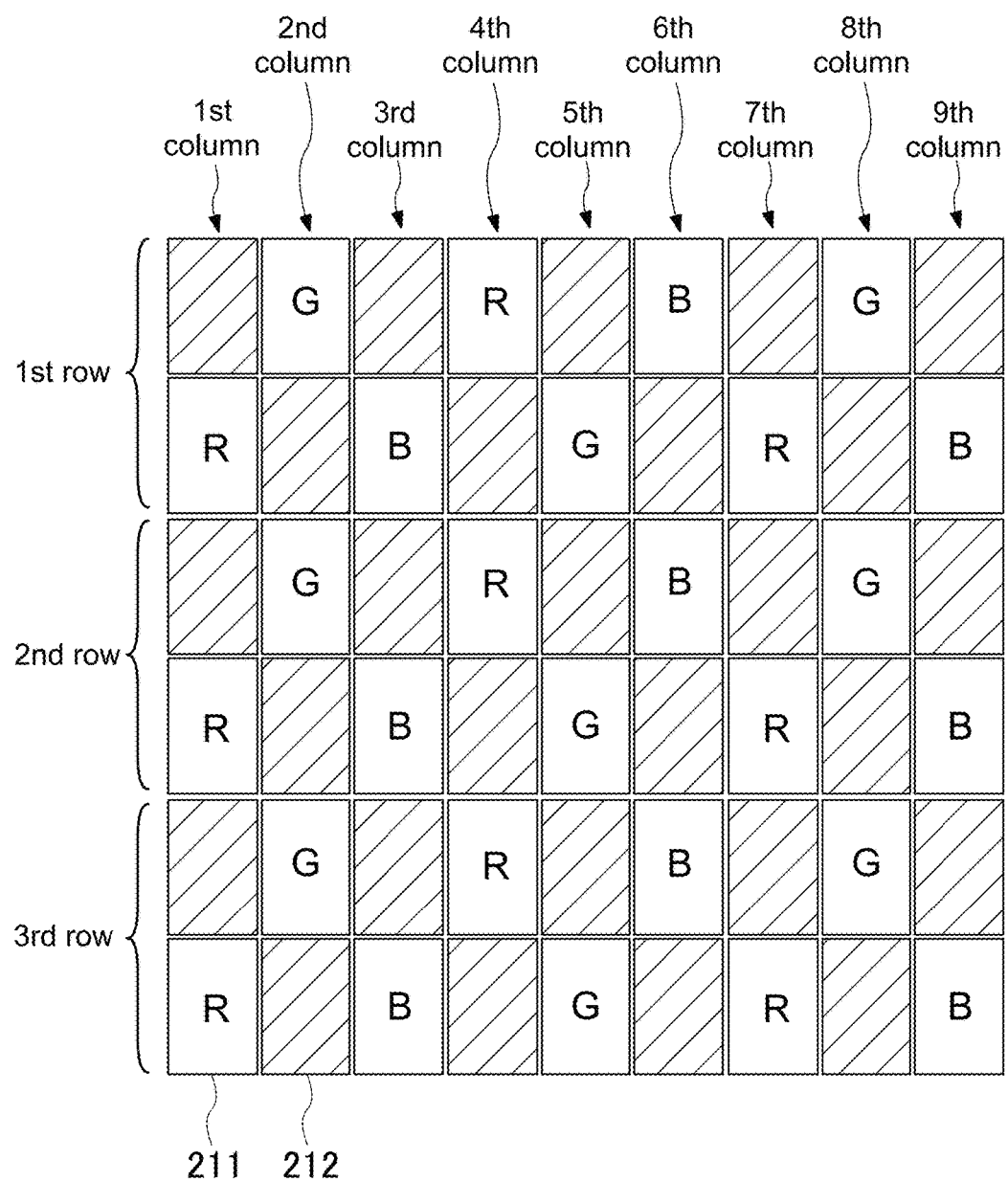
FIG. 7 is a planar view diagram showing a pixel layout of a display device related to a modified example two of embodiment one of the present invention.
Figure 8:
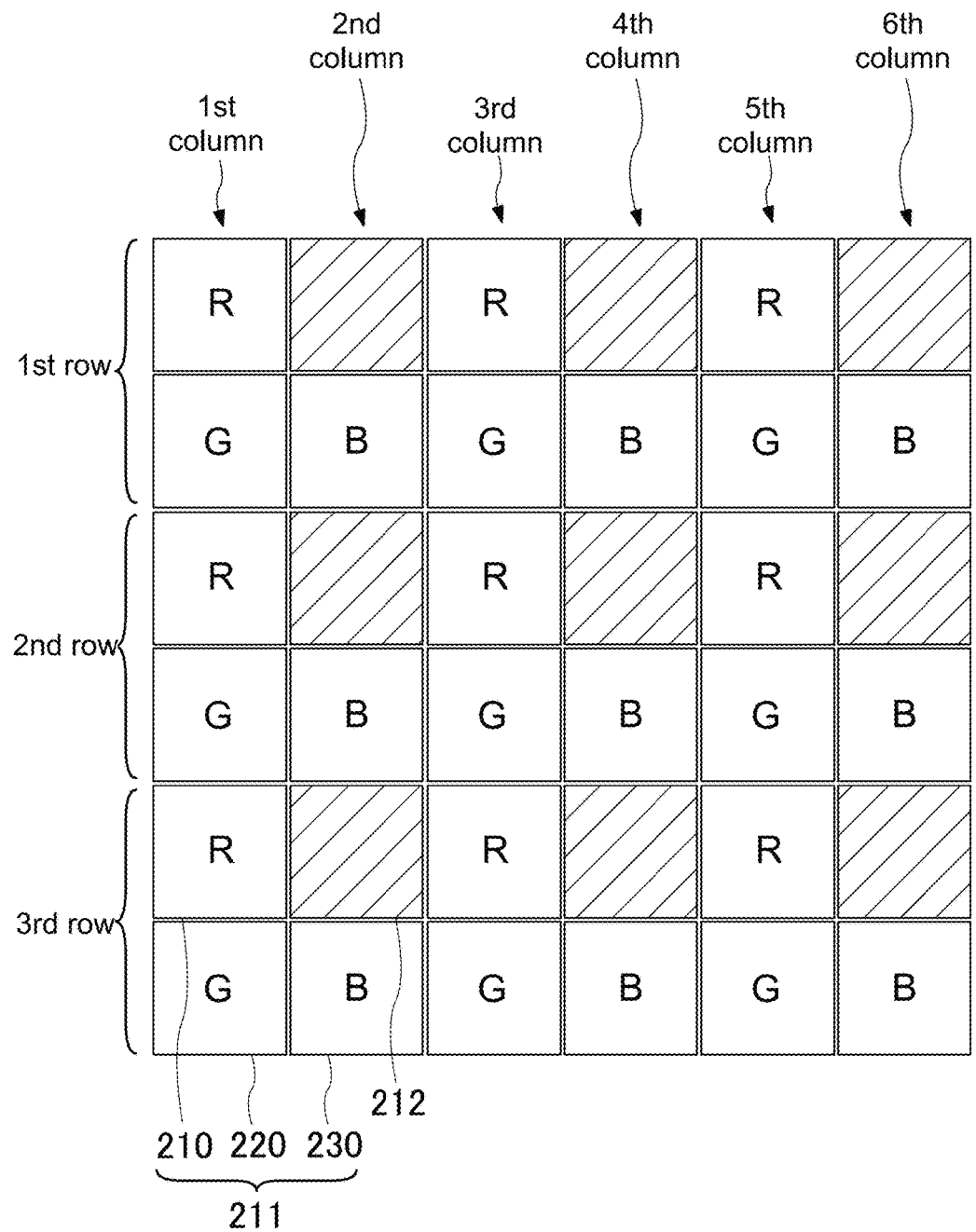
FIG. 8 is a planar view diagram showing a pixel layout of a display device related to a modified example three of embodiment one of the present invention.

A pixel layout of a display device related to a modified example of embodiment one of the present invention is explained using FIG. 6 to FIG. 8. In addition, a structure of a pixel of the display device related to the modified example of embodiment one of the present invention is explained using FIG. 9.

<Pixel Layout of Display Device 11>

FIG. 6 is a planar view diagram showing a pixel layout of a display device related to a modified example one of embodiment one of the present invention. In FIG. 6, the area marked with R, G, B is the first display part 211 including a light emitting layer, and an area marked with a diagonal line is the second display part 212 including a PDLC layer. According to the display device 11 shown in FIG. 6, the arrangement of the pixels on a second column, fifth column and eighth column is different the arrangement of the other pixels on the other columns in first display part 211 and second display part 212. In FIG. 2 and FIG. 5, although the second display part 212 is adjacent to the first display part 211 which emits the same color light, in FIG. 6, the second display part 212 is adjacent to three or four first display parts 211. In addition, the color of the light emitting by adjacent first display parts 211 includes different colors.

FIG. 7 is a planar view diagram showing a pixel layout of a display device related to a modified example two of embodiment one of the present invention. Although the display device 12 is similar to the display device 11 shown in FIG. 6, the display device 12 is different to the display device 11 in that the first display part 211 and second display part 212 are alternately provided in a row direction and column direction. That is, in the display device 12, the second display part 212 is adjacent to four display parts 211 in a pixel except pixels provided in an end part of a pixel area provided with a plurality of pixels. In addition, the color of the light emitted by adjacent first display parts 211 includes all the colors R, G and B.

FIG. 8 is a planar view diagram showing a pixel layout of a display device related to a modified example three of embodiment one of the present invention. In the display device 13 shown in FIG. 8, one second display part 212 is provided with respect to three first display parts 211 (R pixel 210, G pixel 220 and B pixel 230). In the display device 13, the second display part 214 is adjacent to four first display parts 211 in a pixel except pixels provided in an end part of a pixel area. Here, the second display part 212 is adjacent to the B pixel 230 in a column direction and adjacent to the R pixel 210 in a row direction.

As described above, according to the display device related to a modified example of embodiment one of the present invention, the second display part 212 which includes a PDLC layer is adjacent to the first display part 211 in a row direction and column direction. Therefore, it is possible to improve light extraction efficiency since the second display part 211 disperses more light. In addition, since the second display part 212 is provided between first display parts 211 which emit light of different colors, it is possible to output an intermediate color of the first display part 211 which emits light in different colors. As a result, it is possible to improve visual resolution. In addition, by providing the layout shown in FIG. 8, since the first display part 211 (R pixel 210 and B pixel 230) which outputs R and B which have comparatively low visibility among the three colors R, G and B, is adjacent to the second display part 212, it is possible to selectively improve the light extraction efficiency of R and B which have low visibility and control to reduce a light emitting area because of providing the second display part 212.

<Cross-Sectional Structure of a Pixel>

Figure 9:
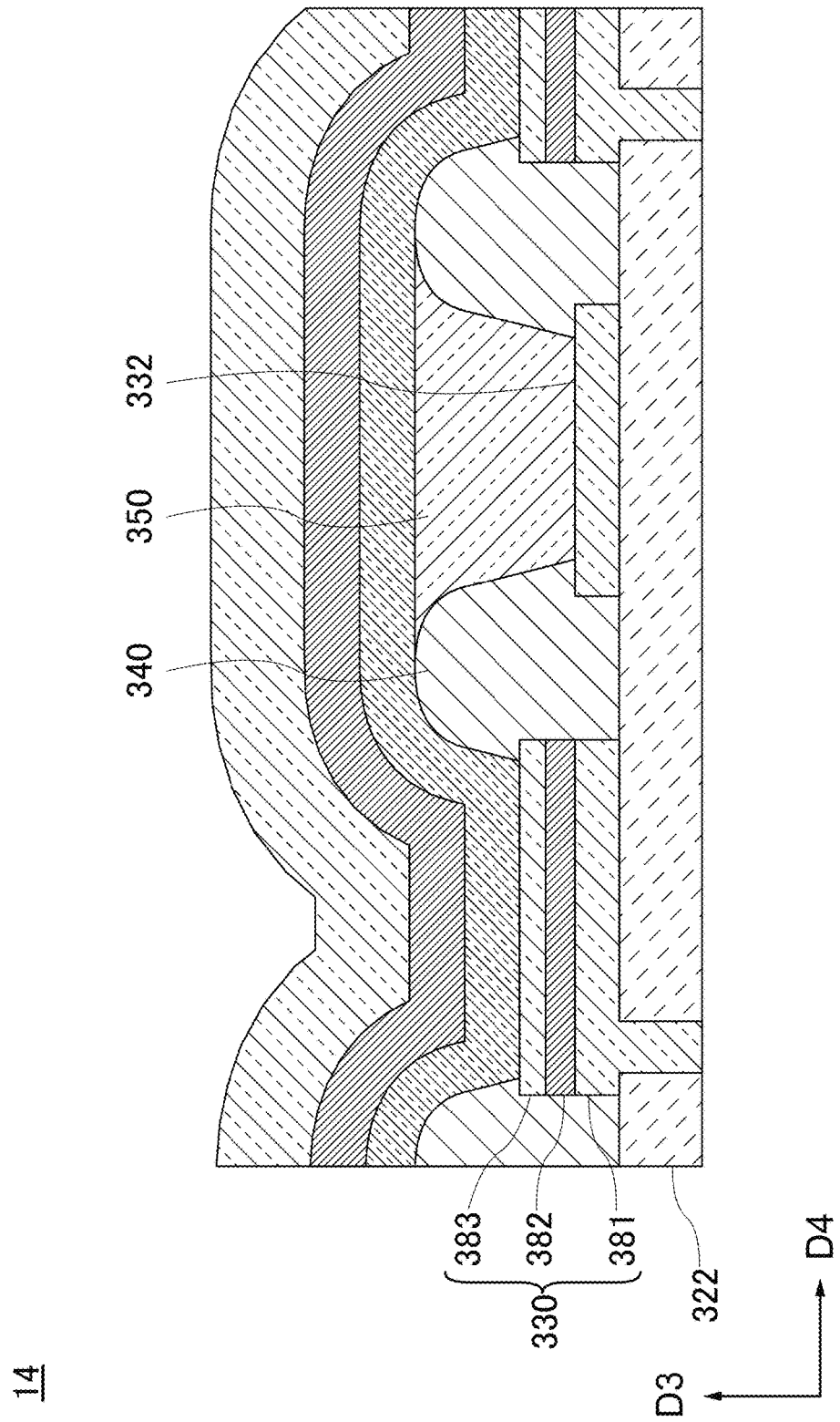
FIG. 9 is a cross-sectional diagram showing a pixel layout of a display device related to a modified example four of embodiment one of the present invention.

FIG. 9 is a cross-sectional diagram of a pixel of a display device related to a modified example four of embodiment one of the present invention. As is shown in FIG. 9, the pixel electrode 330 of display device 14 includes a first transparent conductive layer 381, a reflective metal layer 382 and second transparent conductive layer 383. In addition, the first transparent conductive layer 381 and PDLC electrode 332 or the second transparent conductive layer 383 and PDLC electrode 332 may be formed in the same process. That is, the first transparent conductive layer 381 and PDLC electrode 332 or the second transparent conductive layer 383 and PDLC electrode 332 may be formed in the same layer. Specifically, ITO may be used as the first transparent conductive layer 381, Ag may be used as the reflective metal layer 382 and ITO may be used as the second transparent conductive layer 383

As described above, according to the display device related to a modified example of embodiment one of the present invention, it is possible to form a PDLC electrode 332 using a part of a top emission type reflective electrode. Therefore, it is possible to form the pixel electrode 330 and PDLC electrode 332 in the same process and obtain the effects of a reduction in processes and a reduction in manufacturing costs.

(Embodiment Two)

Figure 10:
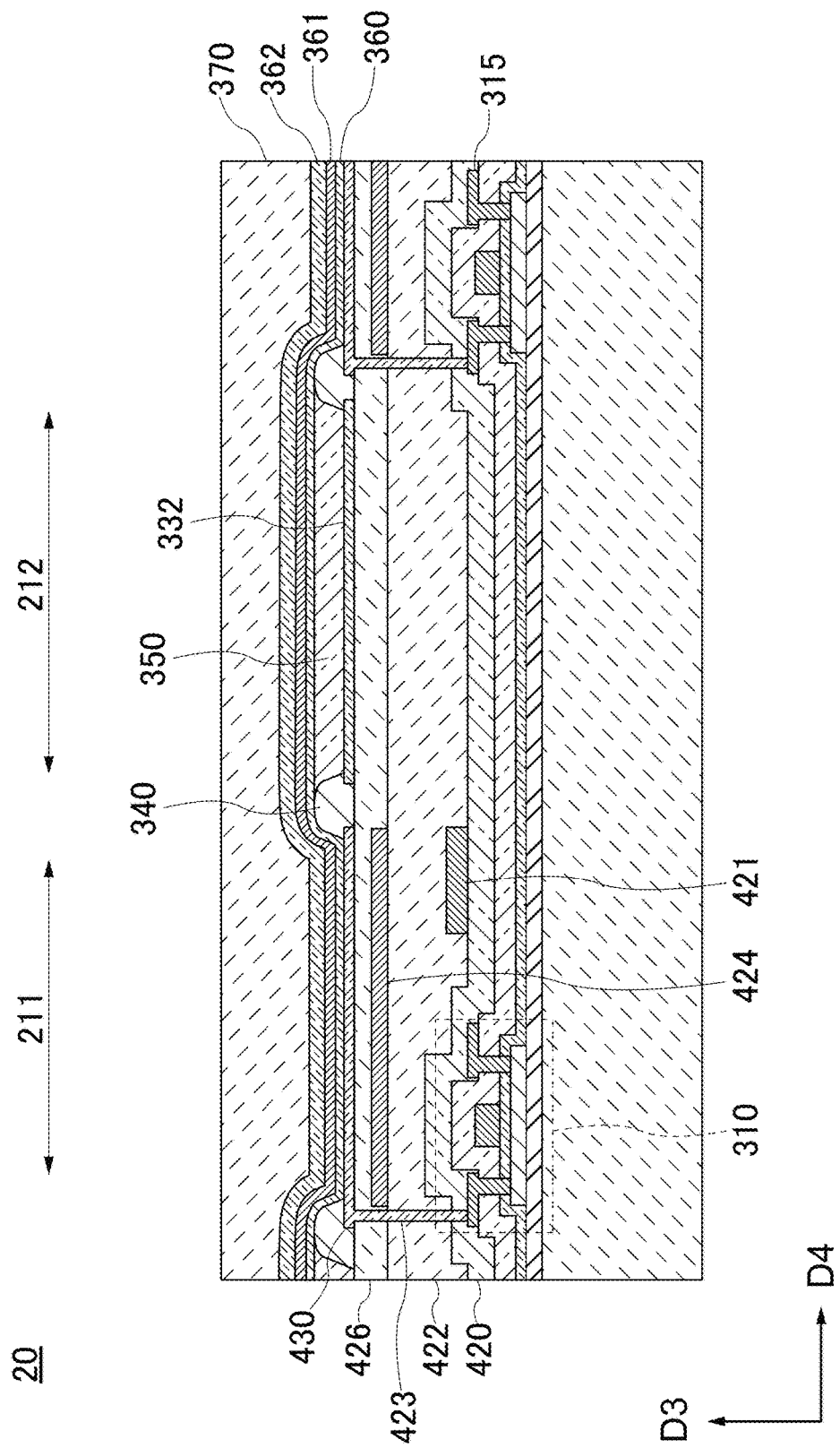
FIG. 10 is a cross-sectional diagram of a pixel of a display device related to embodiment two of the present invention.
Figure 11:
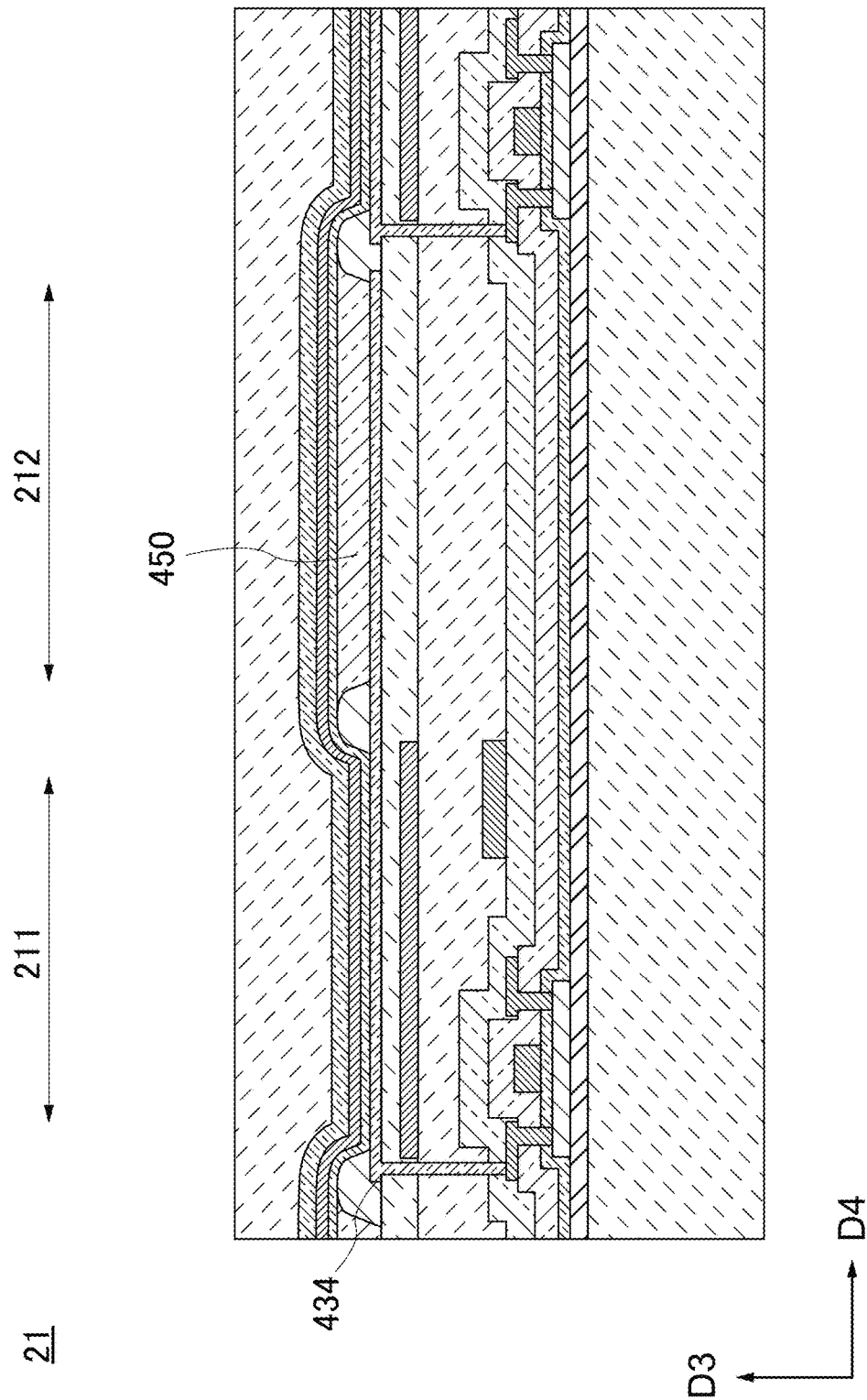
FIG. 11 is a cross-sectional diagram of a pixel of a display device related to a modified example of embodiment two of the present invention.

A cross-sectional structure of a display device related to embodiment two of the present invention is explained using FIG. 10 and FIG. 11. A display device 20 of embodiment two is a top emission type organic EL display device which outputs light in an upper surface direction from an R, G. B light emitting element the same as the display device 10 in embodiment one. However, the display device 20 is different to the display device 10 in that a pixel electrode 430 includes transparency and a reflective layer 424 which reflects light output from the light emitting layer 360 in a lower surface direction (opposite direction to the arrow of the direction D3) in an upper surface direction (arrow direction of the direction D3) is provided separately to the pixel electrode 430. Although a display device using a PDLC is also exemplified as a light function layer in embodiment two, a display device which uses an element which can control the diffusion state and transparency state of other light is also possible. In addition, an element which can control the reflective state and transparency state of light may also be used.

<Cross-Sectional State of a Pixel>

FIG. 10 is a cross-sectional diagram of a pixel of a display device related to embodiment two of the present invention. The cross-sectional structure of the display device 20 shown in FIG. 10 is similar to the cross-sectional structure of the display device 10 shown in FIG. 3. However, unlike the display device 10, the display device 20 includes a second interlayer layer 420, upper layer wiring layer 421, third interlayer layer 422, reflective layer 424, fourth interlayer layer 424 and pixel electrode 430. The second interlayer layer 420 is provided above the transistor 310. The upper layer wiring layer 421 is provided above the second interlayer layer 420. The third interlayer layer 422 is provided above the second interlayer layer 420 and above the upper layer wiring layer 421 and relieves a step formed by the transistor 310 and upper layer wiring layer 421. The reflective layer 424 is provided above the third interlayer layer 422. The fourth interlayer layer 426 is provided above the reflective layer 424. The pixel electrode 430 is provided above the fourth interlayer layer 426 and includes transparency. Here, a via 423 is provided in the second interlayer layer 420, the third interlayer layer 422 and the fourth interlayer layer 426. By contacting the pixel electrode 430 provided with the via 423 to the source/drain electrode 315, the source/drain electrode 315 and pixel electrode 430 are connected. In addition, the common electrode 361 includes transparency the same as the display device 10 and the pixel electrode 430 and the PDLC electrode 332 are electrically independent.

It is possible to select a material with a high reflectance as the reflective layer 424, for example it is possible to use Al, Ti, Mo, Ni, Ag or an alloy of these. In addition, a structure is possible in which films using these materials are stacked. The reflective layer 424 may be electrically connected with other wiring or electrodes or electrically independent. Here, in the case where the reflective layer 424 is electrically connected with other wiring or electrodes, it is possible to form a capacitor which turns the fourth interlayer layer 426 provided between the reflective layer 424 and pixel electrode 430 into a dielectric. It is also possible to use the capacitor as a retention volume of each pixel.

In addition, the distance between the reflective layer 424 and pixel electrode 430 may be adjusted so as to obtain resonance effects with respect to each light emitting wavelength in each pixel R, G, B, that is, micro-cavity effects. That is, the distance between the reflective layer 424 and pixel electrode 430 may be adjusted so that they are mutually different in each first display part of adjacent pixels which output different color light. Specifically, by forming the fourth interlayer layer 426 to have a different film thickness with respect to each pixel which outputs different color light, it is possible to adjust the distance between the reflective layer 424 and pixel electrode 430. Furthermore, in order to realize a micro-cavity, it is preferred that the pixel electrode 430 has a lower transparency ratio in visible light than the fourth interlayer layer 426 and semi-transparency with a higher transparency ratio in visible light than the reflective layer 424.

As described above, in the case where a photosensitive resin is used in order to form the fourth interlayer layer 426 with a different film thickness by a pixel, it is possible to use a multi-tone mask such as a halftone mask or grey tome mask. By using a multi-tone mask it is possible to obtain the fourth interlayer layer 426 with a different film thickness by a pixel in the same process. In addition, even in the case where the fourth interlayer layer 426 is not a photosensitive material, it is possible to form a resist with a different thickness by using a multi-tone mask above the fourth interlayer layer 426, and obtain the fourth interlayer layer 426 with a film thickness corresponding to the thickness of a resist thickness by dry etching the entire surface.

As described above, according to the display device related to embodiment two of the present invention, it is possible to use the reflective layer 424 and pixel electrode 430 of a top emission type display device in a pair of electrodes of a capacitor element. Therefore, it is not necessary to secure separate space for a capacitor element and it is possible to improve an aperture ratio. In addition, it is possible to increase color purity using the effects of microcavities.

FIG. 11 is a cross-sectional diagram of a pixel of a display device related to a modified example of embodiment two of the present invention. Although the display device 21 is similar to the display device 20 shown in FIG. 10, the display device 21 is different to the display device 20 in that the pixel electrode 430 and PDLC electrode 332 which were electrically independent in the display device 20 are electrically connected, and instead of a PDLC layer, a reverse PDLC layer 450 which becomes a transparent state by not applying a voltage and which becomes a diffusion state by applying a voltage is used. In other words, in the display device 21, the pixel electrode 430 and the PDLC electrode 332 in the display device 20 are continuous. In addition, in other words, the pixel electrode 434 is provided in common with the first display part 211 and the second display part 212. Here, the higher the voltage applied, the stronger the dispersed intensity of the reverse PDLC layer 450.

As described above, according to the display device related to a modified example of embodiment two of the present invention, by using the reverse PDLC layer 450 instead of a PDLC layer, and operating the reverse PDLC layer 40 using gradation data which determines the light emitting intensity of a pixel, it is possible to selectively control the reverse PDLC layer 450 provided in a light emitting pixel. As a result, it is possible to reduce power consumption. Furthermore, since the dispersed intensity is stronger the higher the voltage applied to the reverse PDLC layer 450, the stronger the light intensity of the second display part the larger the amount of dispersed light. Therefore, it is possible to widen the dynamic range of a display device.

<Embodiment Three>

Figure 12:
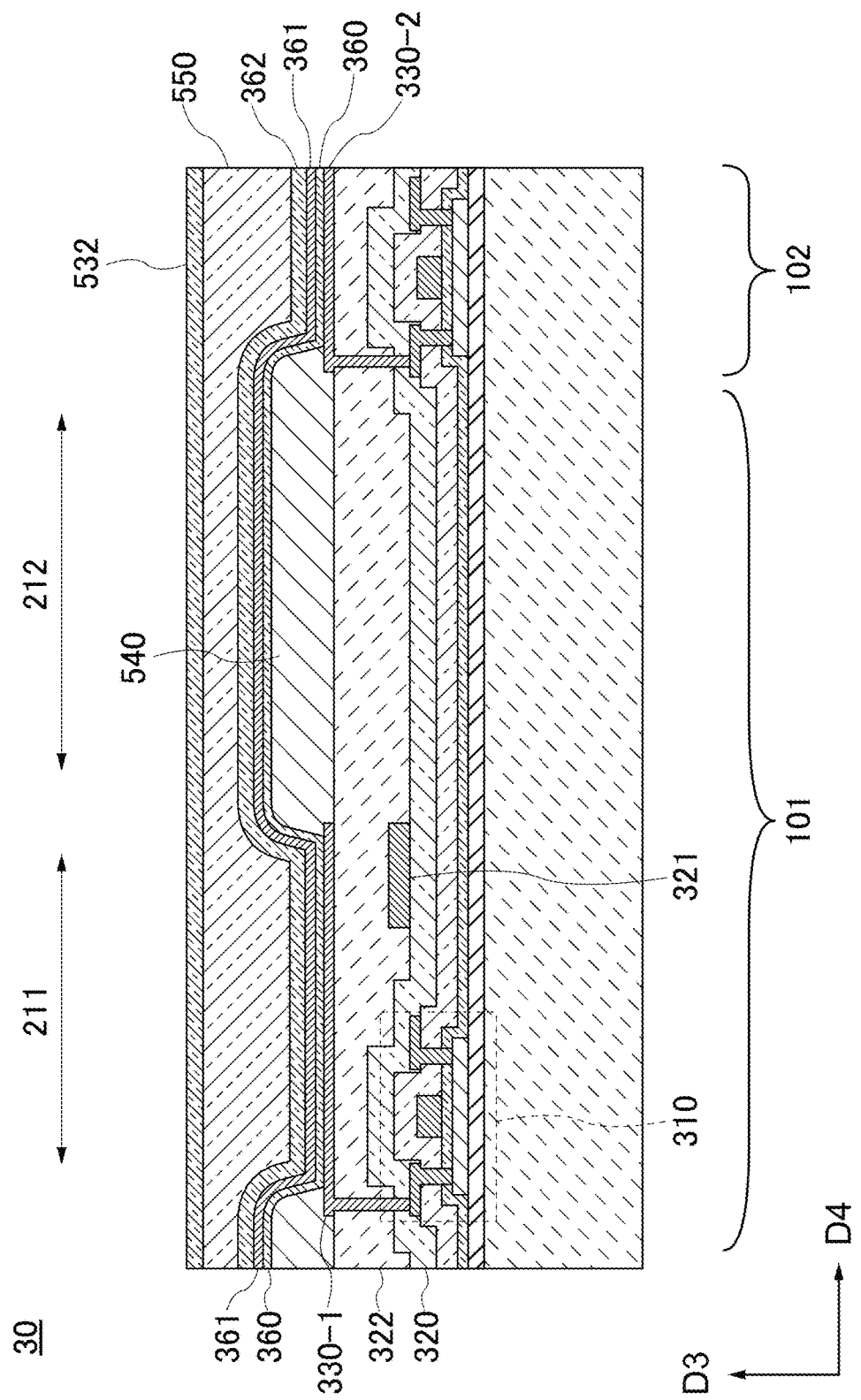
FIG. 12 is cross-sectional diagram of a pixel of a display device related to embodiment three of the present invention.
Figure 13:
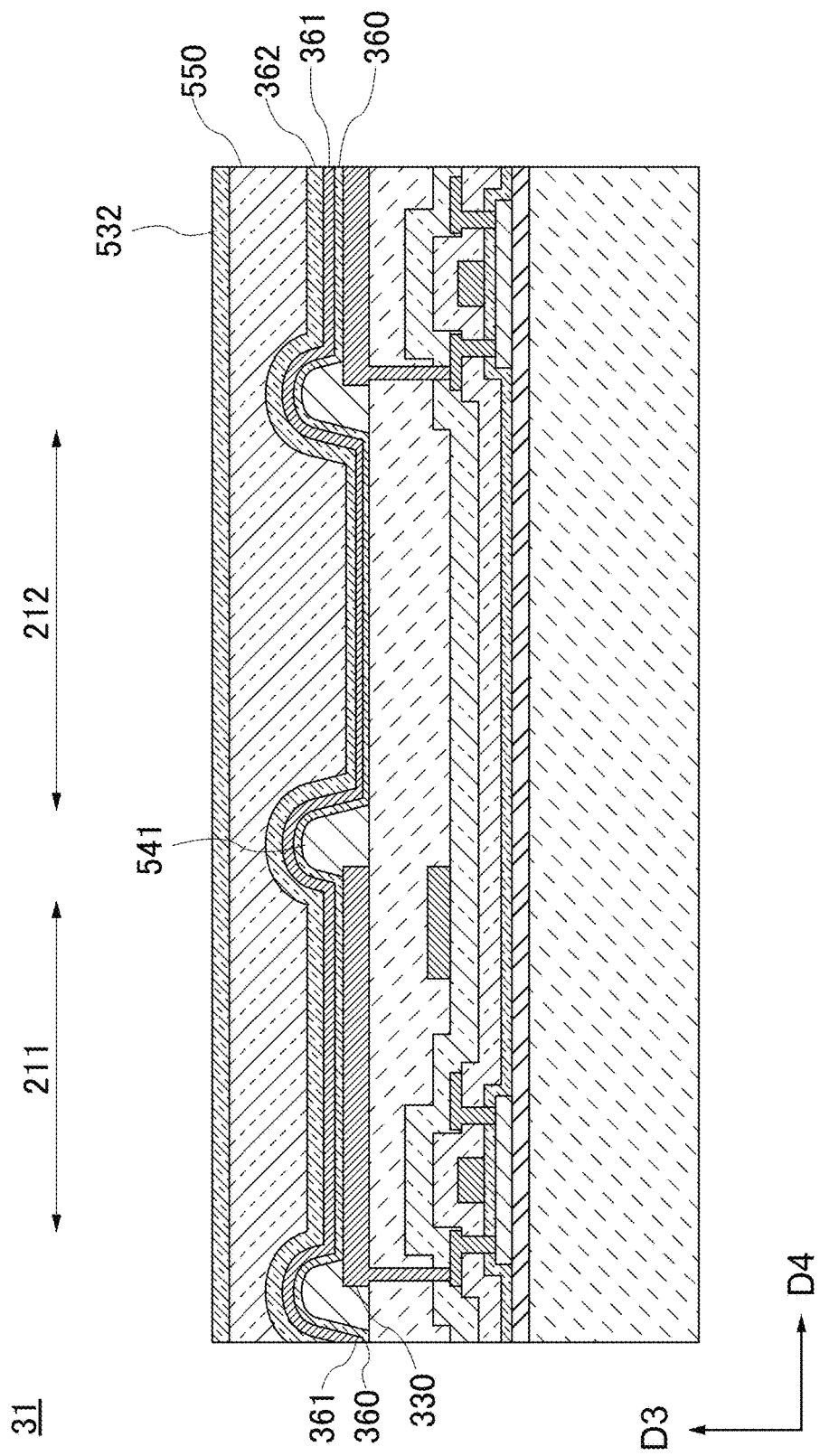
FIG. 13 is a cross-sectional diagram of a pixel of a display device related to a modified example of embodiment three of the present invention.

A cross-sectional structure of a display device related to embodiment three of the present invention is explained using FIG. 12 and FIG. 13. The display device 30 in embodiment three is a top emission type organic EL display device which outputs light in an upper surface direction (arrow direction D3) from R, G, B light emitting elements the same as the display device 10 in embodiment one. However, the display device 30 is different to the display device 10 in that a light function layer is provided on an upper layer (arrow direction D3) of a common electrode. Although a display device using PDLC as a light function layer is also exemplified in embodiment three, the display device may also use an element which can control the diffusion state and transparent state of other light. In addition, an element which can control the reflecting state and transparent state may also be used.

<Cross-Sectional Structure of a Pixel>

FIG. 12 is a cross-sectional diagram of a pixel of a display device related to embodiment three of the present invention. Although the cross-sectional structure of the display device 30 shown in FIG. 12 is similar to the cross-sectional structure of the display device 10 shown in FIG. 3, the display device 30 is provided with pixel electrode 330 (330-1, 330-2). The pixel electrode 330 and a PDLC electrode are not aligned so as to pass a plane parallel to a surface of a substrate. That is, a PDLC electrode is not provided on the interlayer layer 322. A side wall 540 which covers an end part of the pixel electrode 330 and which section adjacent pixels is provided on the interlayer 322. That is, the side wall 540 in the adjacent first pixel 101 and second pixel 102 covers an end part of the pixel electrode 330-1 in the first pixel 101 and covers the pixel electrode 330-2 in the second electrode 102 and includes an aperture part in an area corresponding to the first pixel 101.

In addition, the display device 30 includes a light emitting layer 360, common electrode 361, protective layer 362, PDLC layer 550 and PDLC electrode 532. The light emitting layer 360 is provided above the pixel electrode 330 and above the side wall 540. The common electrode 361 of a light emitting element 360 is provided above the light emitting layer 360. The protective layer 362 is provided to cover the light emitting layer 360 and the common electrode 361 and includes at least moisture resistance. The PDLC layer 550 is provided above the protective layer 362. The PDLC electrode 532 is provided above the PDLC layer 550. Here, the light emitting layer 360, common electrode 361, protective layer 362, PDLC layer 550 and PDLC electrode 532 are provided in common with a plurality of pixels.

When the above described structure is described differently, the light emitting element of the display device 30 includes the first display part 211 and the second display part 212. The first display part 211 includes a pixel electrode 330, common electrode 361, PDLC electrode 532, a light emitting layer 360 provided between the pixel electrode 330 and common electrode 361, and a PDLC layer 550 provided between the common electrode 361 and PDLC electrode 532 and can control the diffusion state and transparent state of light. The second display part 212 includes a common electrode 361, PDLC electrode 532, and PDLC layer 550 provided between the common electrode 361 and PDLC electrode 532 and can control the diffusion state and transparent state of light.

Here, the pixel electrode 330 is provided separately with respect to a plurality of pixels and the common electrode 361 and PDLC electrode 532 are provided in common with a plurality of pixels. In addition, the light emitting layer 360 and at least a part of the PDLC layer 550 are aligned so as to pass a plane parallel to a surface of a substrate. Specifically, the light emitting layer 360 provided above the side wall 540 in the second display part 212 and the PDLC layer 550 provided above the pixel electrode 330 and not covering the side wall 540 in the first display part 211 have at least one which is the same height.

Here, because the display device 30 is exemplified as a top-emission type display device, the pixel electrode 330 includes reflectance and the common electrode 361 includes transparency. In addition, the PDLC electrode 532 includes transparency. In addition, it is possible to apply the structure shown in FIG. 9 as the pixel electrode 330 of the display device 30. Furthermore, instead of the pixel electrode 330 of the display device 30, it is possible to apply the reflective layer 424, fourth interlayer layer 426 and structure of the pixel electrode 430 having transparency.

In addition, instead of the pixel electrode 330 of the display device 30, in the case where the structure shown in FIG. 10 is applied, the distance between the reflective layer 424 and pixel electrode 430 may be adjusted so as to obtain resonance effects with respect to each light emitting wavelength in each pixel R, G, B, that is, micro-cavity effects. That is, the distance between the reflective layer 424 and pixel electrode 430 may be adjusted so that they are mutually different in each first display part of adjacent pixels which output different color light. Specifically, by forming the fourth interlayer layer 426 to have a different film thickness with respect to each pixel which outputs different color light, it is possible to adjust the distance between the reflective layer 424 and pixel electrode 430. Furthermore, in order to realize a micro-cavity, it is preferred that the pixel electrode 430 has a lower transparency ratio in visible light than the fourth interlayer layer 426 and semi-transparency with a higher transparency ratio in visible light than the reflective layer 424.

As described above, according to the display device 30 related to embodiment 30, since the PDLC layer 550 and PDLC electrode 532 are provided in common with a plurality of pixels, it is not necessary to pattern the PDLC layer 550 and PDLC electrode 532 to a high level of accuracy. Therefore, manufacture is possible with a more simple process and device, and it is possible to obtain the effects of a reduction in processes, improvement in yield and reduction in manufacture costs.

FIG. 13 is a cross-sectional diagram of a pixel of a display device related to a modified example of embodiment three of the present invention. Although the display device 31 shown in FIG. 13 is similar to the display device 30 shown in FIG. 12, the display device 31 is different to the display device 30 in that the side wall 541 includes an aperture part in an area corresponding to the first display part 211 and second display part 212, and the second display part 212 includes an area in which the side wall 541 is not provided.

As is shown in FIG. 13, since the PDLC layer 550 is provided in an area in which the side wall 541 is not present in the second display part 212, the PDLC layer 550 in the second display part 212 is provided at a height near the light emitting layer 360 in the first display part 211 compared to FIG. 12. In addition, if the film thickness of the pixel electrode 330 is thicker than the total film thickness of the light emitting layer 360, the common electrode 361 and protective layer 362, the light emitting layer 360 in the first display part 211 and the PDLC layer 550 in the second display part 212 have the same height. In other words, the light emitting layer 360 in the first display part 211 and the PDLC layer 550 in the second display part 212 are aligned so as to pass a plane parallel to a surface of a substrate.

As described above, according to the display device 31 related to a modified example of embodiment three, by aligning the light emitting layer 360 in the first display part 211 and the PDLC layer 550 in the second display part 212 so as to pass a plane parallel to a surface of a substrate, it is possible to make the PDLC layer 550 disperse light output from the light emitting layer 360 in a planar direction (direction D4) of a substrate in an upper surface direction (direction D3). Therefore, it is possible to extraction more light output from a light emitting layer to the exterior and improve light extraction efficiency.

<Operation of PDLC Layer 350>

Here, the operation of the PDLC layer 350 used as a light function layer in the present invention is explained. The PDLC layer 350 forms a unique polymer network structure within a liquid crystal layer. Specifically, the PDLC layer 350 has a structure in which liquid crystal droplets 610 including liquid crystal molecules 600 are wrapped by a polymer 620 and provided between the first electrode 630 and second electrode 640.

In a state (non-electric field state) in which an electric field in not applied between electrodes and a voltage is not applied to the first electrode 630 and the second electrode 640, the liquid crystal molecules 600 head in a random direction within the droplets 610. Therefore, the light 650 emitted to the PDLC layer 350 is dispersed by the liquid crystal molecules 600. That is, the PDLC layer 350 is in a diffusion state in a state where an electric field is not applied. On the other hand, in a state where a voltage generated by a potential difference is applied to the first electrode 630 and the second electrode 640 and an electric field is applied between the electrodes (electric field applied state), the liquid crystal molecules 600 head in one direction along the electric field within the droplets 610. Therefore, the light 660 emitted to the PDLC layer 350 is not dispersed by the liquid crystal molecules 600 and passes through the PDLC layer 350. In other words, the PDLC layer 350 is in a transparent state in a state where an electric field is applied.

Here, although a display device using a PDLC layer 350 as a light function layer of the present invention is exemplified, a display device which uses an element which can control the diffusion state and transparent state of other light is also possible. In addition, a light function layer which can control the reflective state and transparent state of light may also be used.

Furthermore, the present invention is not limited to the embodiments described above and appropriate modifications are possible without departing from the scope of the invention.

What is claimed is:

1. A display device including a plurality of pixels comprising:
   a first display part including a first electrode, a second electrode and a light emitting layer provided between the first electrode and the second electrode;
   a second display part including the second electrode, a third electrode and a light function layer provided between the second electrode and the third electrode, the light function layer controlling the diffusion state or transparency state of light and being provided on a side of the second electrode facing the light emitting layer; and
   a side wall covering an end part of the first electrode and an end part of the third electrode, the side wall being provided with an aperture part in a region corresponding to the first display part and the second display part.

2. The display device according to claim 1, wherein each of the first electrode and the third electrode of the plurality of pixels are mutually provided separately, and the second electrode is provided in common with the plurality of pixels.

3. The display device according to claim 1, wherein the first electrode has reflectance and the second electrode and third electrode have transparency.

4. The display device according to claim 3, wherein the light emitting layer and at least one part of the light function layer are aligned so as to pass a plane parallel to a surface of a substrate provided with the first display part and the second display part.

5. The display device according to claim 3, wherein the first electrode includes a first transparent conductive layer, a second transparent conductive layer and a reflective metal layer provided between the first transparent conductive layer and the second transparent conductive layer.

6. The display device according to claim 1, wherein the first display part further includes a reflecting layer provided on a side of the first electrode facing away from the light emitting layer, and an insulation layer provided between the first electrode and the reflecting layer, and the first electrode, the second electrode and the third electrode have transparency.

7. The display device according to claim 6, wherein the first electrode and the third electrode are continuous.

8. The display device according to claim 1, wherein the first display part further includes a reflecting layer provided on a side of the first electrode facing away from the light emitting layer, and a transparent layer provided between the first electrode and the reflecting layer, the first electrode has semi-transparency and the second electrode and the third electrode have transparency.

9. The display device according to claim 1, wherein the first electrode and the third electrode are electrically connected.

10. The display device according to claim 1, wherein the light function layer includes polymer dispersed liquid crystals and the polymer dispersed liquid crystals are controlled to a diffusion state or transparency state by applying an electric field between the first electrode and the third electrode.

11. A display device including a plurality of pixels comprising:
   a first display part including a first electrode, a second electrode, a third electrode, a light emitting layer provided between the first electrode and the second electrode, and a light function layer provided between the second electrode and the third electrode, the light function layer controlling a diffusion state or transparency state of light, each of the first electrodes of the plurality of pixels are mutually provided separately and the second electrode and the third electrode are provided in common with the plurality of electrodes;
   a second display part including the second electrode, the third electrode and the light function layer provided between the second electrode and the third electrode; and
   a side wall covering an end part of the first electrode in the first pixel among the plurality of pixels, and an end part of the first electrode in a second pixel adjacent to the first pixel, the side wall being provided with an aperture part in a region corresponding to the first pixel and the second pixel, the second electrode in the second display part of the first pixel being provided above the side wall;
   wherein the light emitting layer and at least one part of the light function layer are aligned so as to pass a plane parallel to a surface of a substrate provided with the first display part and the second display part.

12. The display device according to claim 11, wherein the first electrode has reflectance and the second electrode and the third electrode have transparency.

13. The display device according to claim 12, wherein the first electrode includes a first transparent conductive layer, a second transparent conductive layer and a reflective metal layer provided between the first transparent conductive layer and the second transparent conductive layer.

14. The display device according to claim 11, wherein the first display part further includes a reflecting layer provided on a side of the first electrode facing away form the light emitting layer, and an insulation layer provided between the first electrode and the reflecting layer, and the first electrode, the second electrode and the third electrode have transparency.

15. The display device according to claim 11, wherein the first display part further includes a transparent layer provided on a lower layer of the first electrode and a reflecting layer provided on a lower layer of the transparent layer, the first electrode has semi-transparency with a lower visible light transparency than the transparent layer and a higher visible light transparency than the reflecting layer, and the transparent layer has a film thickness which resonates light of a fixed wavelength among the visible light output from the light emitting layer.

16. The display device according to claim 11, wherein the light function layer includes polymer dispersed liquid crystals and the polymer dispersed liquid crystals are controlled to a diffusion state or transparency state by applying an electric field between the first electrode and the third electrode.

* * * * *